United States Patent Office 3,551,105
Patented Dec. 29, 1970

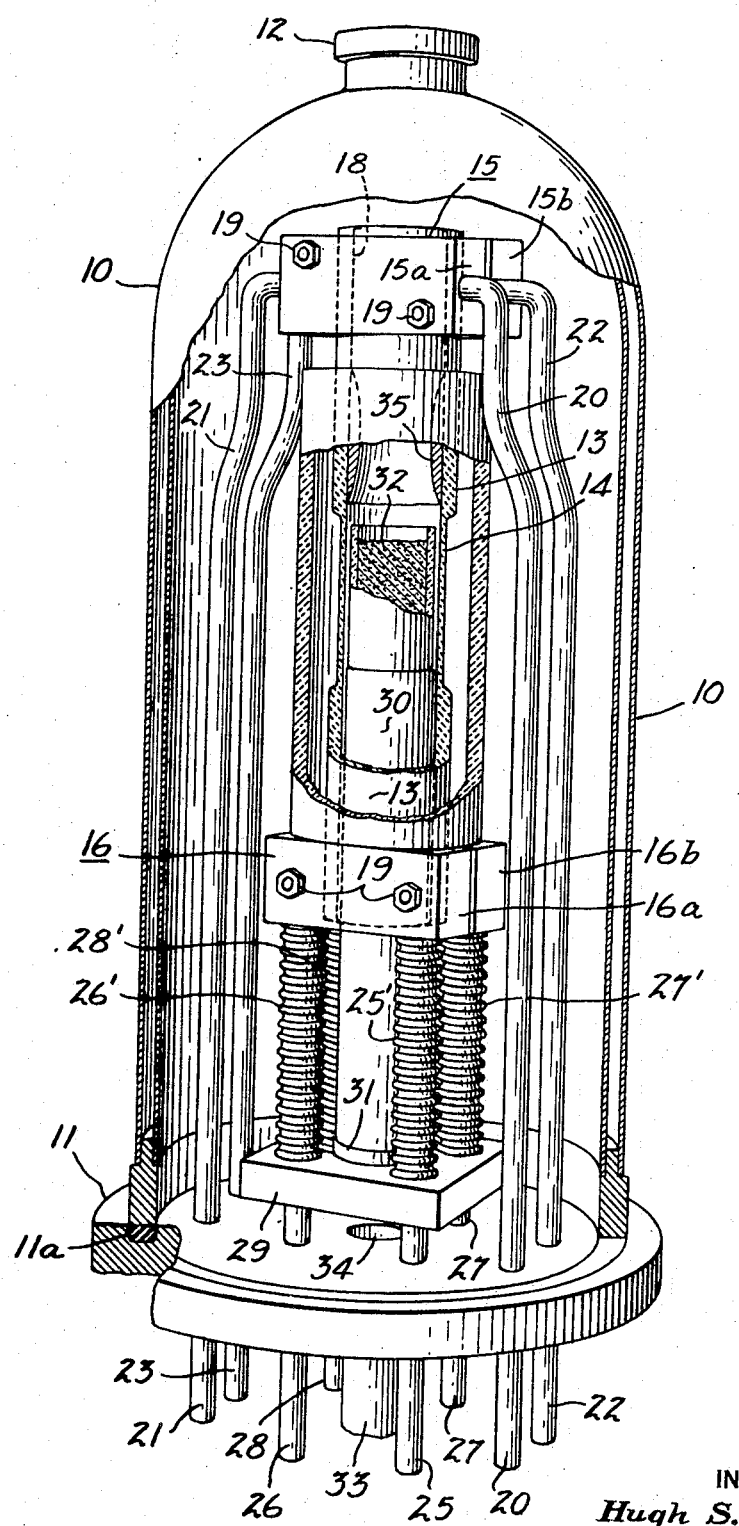

3,551,105
PURIFICATION OF ELEMENTAL BORON
Hugh S. Cooper, Shaker Heights, Ohio, assignor to Walter M. Weil
Filed Feb. 1, 1966, Ser. No. 524,242
Int. Cl. C01b 35/00; B01j 7/00
U.S. Cl. 23—209                    1 Claim

ABSTRACT OF THE DISCLOSURE

Process and apparatus for purifying crude elemental boron which contains impurities including boron suboxides. A chamber containing the impure boron is evacuated to a pressure of about 0.1 micron to about 200 microns of mercury, and the boron is heated to a temperature within the range of 1800° C. to about 2100° C. Zones within the chamber are maintained at cooler temperatures so that the boron suboxides are condensed thereon. Noncondensables are drawn away from the cooler zones and out of the chamber by continuing the evacuation of the chamber during the heating step.

---

The present invention relates to the purification of elemental boron and, more particularly, to a method for purifying crude, elemental, powdered boron containing, as a principal impurity, boron suboxides and, as a secondary impurity, carbon.

It has previously been discovered that elemental boron has a number of properties that make it potentially of great value in many fields. Within recent years, particularly, the need for elemental boron has rapidly grown for such applications as control of nuclear reactors, shields for nuclear radiation, instruments for detecting neutrons, high temperature technologies, and fuels, as well as less sophisticated but highly varied chemical and mechanical applications.

While boron is not generally considered to be a rare element, it does not exist in nature in an elemental state. Accordingly, it is necessary to extract boron from its compounds for those applications requiring the use of boron in elemental form.

Several methods are known by which crude elemental boron may be produced, and several refining processes have been suggested for upgrading crude elemental boron to a state of relatively high purity, some of which are effective to a degree, but none of which is sufficiently so to meet present requirements for ultra-high purity boron of about 99.5 percent purity or better. Moreover, some of the more successful of the prior upgrading processes are so expensive as to be of little or no commercial utility. Experience has shown it to be quite difficult to remove small concentrations of certain impurities from elemental boron, particularly oxygen, for which elemental boron has a great affinity. Many efforts to remove combined oxygen have only led to further contamination or recontamination of the ultimate product.

The principal oxygen-containing impurities found in elemental boron produced by several different processes are the boron suboxides, considered to be chiefly $B_6O$ and/or $B_7O$. The upgrading procedures known to date have not been particularly successful in removing the various suboxides. For example, a procedure for producing boron of high purity, as described in United States Pat. 2,866,688 to Mazza et al., is specifically limited to upgrading impure boron-containing materials which are said to be free of boron suboxides. According to that Mazza et al. patent, the crude boron product is prepared from reactants in proportions which are asserted to produce little, if any, boron suboxides. When magnesium is one of the reactants used in producing crude elemental boron, it is utilized in amounts stoichiometrically in excess of the boron-containing compounds in an effort to preclude the formation of boron suboxides. The reason given for seeking to prevent the formation of the suboxides is that they cannot be removed by the leaching operation of that patent in which the crude boron is mixed with molten boric oxide after it has been partially upgraded. However, Mazza et al. were aiming at the production of boron of only about 95 percent purity, and such a material, by present day standards, would be considered a crude boron. Hence, the process of that patent merely confirms the difficulty of achieving the objectives of the present invention.

There are equally serious objections to or deficiencies in other prior upgrading techniques. For example, in the process of purifying elemental boron by some methods, such as that disclosed in United States Pat. 2,987,383 to Schulein et al., it is necessary to consolidate the relatively finely divided boron which is to be purified by compressing it in suitable dies and under sufficient pressure to put it in the form of briquettes. A pressure of about 20,000 pounds per square inch has been recommended as suitable for this purpose. Still further, the Schulein et al. patent teaches that it is very difficult to purify boron by heating at low pressures and high temperatures because the boron is easily recontaminated by the heating elements used to effect the high temperatures and/or by the surrounding parts of the apparatus, for example, the evacuated cell in which such a process might be conducted. No specific temperature or pressure range was mentioned by Schulein et al. in this connection.

United States Pat. 1,019,392 to Weintraub also teaches the purification of crude boron prepared by the magnesium reduction process, the disclosed process involving first briquetting the crude boron into sticks or rods. The briquettes are then fused by passing an electric arc therethrough in a hydrogen atmosphere. This procedure is limited to producing only massive boron, whereas powdered boron is desired for many uses. Moreover, no boron even approaching the presently desired purity has ever been produced by the procedure of that Weintraub patent.

A procedure used heretofore for removing certain impurities from a number of relatively highly refractory materials is to heat the crude materials in vacuo to vaporize the impurities and leave the purified materials as a residue in the vacuum furnace. However, this has apparently not been considered a feasible approach to the problem of substantially completely removing boron suboxides from crude elemental boron, although it is generally disclosed in U.S. Pat. No. 2,794,708 to Haag without mentioning a specific heating temperature or the yield of purified boron, or the effectiveness of the removal of boron suboxides.

In evaluating the disclosure of the last mentioned Haag patent, it should be noted that the previously mentioned Mazza et al. patent characterized Haag's sodium reduction process as one producing a crude boron that is essentially free of boron suboxide (column 3, line 7 and following). The Haag patent made only a vague reference to the vaporization of "boron-containing impurities as well as boron suboxides," and to "these vaporized light brown products" being deposited upon the cooler parts of the furnace and igniting upon entry of air. The purification step of Haag is described only as heating "in a high vacuum furnace at a pressure of <$10^{-4}$ millimeter Hg. absolute and at a temperature of 1000 to 2000° C. until evaporation of the impurities is completed." No specific temperature of treatment within the stated 1000° range was given, nor any information as to the amount of boron suboxide present prior to or after the purification step or the time period required to effect the purification. More significant yet is the failure of Haag to state how much of the starting weight of 65 grams of crude boron was recovered as a 97–99 percent pure product or how much boron was lost by vaporization in the course of the purification step. To appreciate the significance of the omission from the Haag patent of any data on the ultimate yield of purified boron, the state of the art at the time the application for the Haag patent was filed should be still further considered.

A number of circumstances may have been responsible for not using relatively high temperatures and low pressures for the removal of boron suboxides from elemental boron, either before or after the date of the Haag patent. The known published data would lead one to believe that crude boron could not be upgraded effectively under the conditions disclosed by Haag, and especially that boron suboxides could not be effectively separated from elemental boron under such conditions of temperature and pressure. For example, a Russian publication, "Vapor Pressure and High Volatility of Boron," from Fiziko-Khicheskiye Svoistva Elementov by M. P. Slavinskii, published in Moscow in 1952, stated (in translation) that "boron manifests considerably high vapor pressures beginning with 1200° C. and considerable evaporates at 1600° C." Again, in the text, "The Chemistry of Borides," by G. V. Samsonov and L. X. Markouski, page 6, it is stated (in translation) that, "starting at 1200°, boron begins to sublime in a vacuum, while at 1600° the darkening of the vacuum apparatus is very great." The pressure of the boron vapors at 1600° constitutes $10^{-5}$ atmospheres. Finally, as pointed out in the Schulein patent mentioned above, it is difficult to avoid contamination of boron with environmental furnace materials when heating the boron to high temperatures.

It has now been discovered that, contrary to what one would assume from all of the prior art, it is possible to effectively upgrade elemental boron containing boron suboxides as impurities by heating the boron within a narrow temperature and pressure range under carefully controlled conditions. Further, when the crude boron also contains carbon as an impurity, it has been found that $B_2O_3$, already present or added for the purpose, may be used under these temperature and pressure conditions as an oxidizer for the carbon, converting it to a generally non-condensable volatile oxide of carbon, such as carbon monoxide. The reduced $B_2O_3$ apparently becomes a suboxide of boron in the course of the reaction and is then removed in accordance with the present invention.

It is therefore a principal object of the present invention to provide an improved method for producing elemental boron of high purity.

Another object is to provide a method for upgrading boron that contains significant amounts of boron suboxides as impurities.

A further object is to provide a method for upgrading boron containing carbon as an impurity.

A still further object is to provide a method for upgrading boron while avoiding recontamination of the resulting product from the system or environment used.

Additional objects and advantages of the invention will become apparent from the following description and the drawing which shows, with various parts broken away, a perspective view of one form of apparatus for carrying out the present invention.

In accordance with the present invention, crude elemental boron having boron suboxides as impurities is upgraded by heating the boron at a temperature within the range of about 1800° C. to about 2100° C., preferably within the range of about 1850° C. to about 1950° C., and at a pressure within the range of about 0.1 micron to about 200 microns of mercury, absolute pressure, until the boron is at least 99 percent pure. Contrary to prior teachings, it has been found that within such temperature and pressure ranges, elemental boron is stable, whereas the lower oxides of boron are sufficiently volatile to be readily removed as a vapor with substantially no loss of elemental boron, and under proper conditions, no contamination or recontamination of the elemental boron.

By "crude elemental boron" is meant boron, usually in a powdered form, prepared by other processes wherein the boron has a purity in the range of about 90–99 percent. All such relatively crude boron materials encountered in the art have recently been found to contain one or more boron suboxides as a principal impurity. By "boron suboxides" is meant any oxide in which boron is in a lower state of oxidation than in $B_2O_3$. As mentioned above, the suboxides generally encountered in crude boron are considered to be chiefly $B_6O$ and/or $B_7O$.

The temperature and pressure ranges employed in accordance with the present invention have been found necessary to realize the desired boron purity without loss of elemental boron by vaporization. As indicated, it has been discovered that the boron suboxides vaporize at only a slightly lower temperature than the boron, so that a couplet of proper conditions of temperature and a pressure is required to achieve a preferential evaporation of boron suboxides at a practical rate. The suboxides do not vaporize to any significant extent below about 1800° C., while temperatures exceeding 2100° C. cause excessive vaporization of the boron itself. Of course, the ambient pressure affects the rate of vaporization at any selected temperature, so that as a lower temperature is employed within the stated range, the use of lower pressures is necessary to obtain the desired results at a practical rate. It is desirable to carry out the present process at the lower end of the stated pressure range and at the upper end of the stated temperature range, because the removal of the suboxides is thereby accelerated with a minimum vaporization of boron. Pressures below about 10 microns and temperatures above 1900° C. are most effective.

The period of time necessary for the heating step depends upon a variety of factors, such as the amount or weight of the charge, the amount of impurities present, and the particular pressure and temperature employed. Overextending the heating period is harmless as long as the stated temperature and pressure conditions are observed.

The powdered or finely divided boron charge, after briquetting it to compact it, is placed within an enclosure which is then evacuated to a pressure within the range stated. The pressure rises as the charge is heated in the evacuated chamber to above about 1800° C., and the attendant volatilization rate increases, and the pressure may fluctuate during the course of the heating step as the volume of the effluent varies. The pressure may even briefly exceed the recommended maximum, but the continued evacuation of the enclosure should be conducted at a rate sufficient to quickly lower the pressure to a value within the stated range. Normally, when the desired operating pressure remains steady under continuous evacuation and while the charge is in the specified temperature range, most if not all of the impurities have been expelled, and the operation may be considered at an end. As a rule, heating for about one to four hours is sufficient for most crude boron charges.

The use of certain appaartus has been found to facilitate the described upgrading operation. Because of the relatively low pressure range employed and the character of the crude boron charge, electrical resistance heating is the most convenient, and the heat so generated should be concentrated as much as possible on the crude boron charge itself and substantially coextensively with the volume of the charge, rather than to use a general heating system which heats virtually the entire volume of the enclosure containing the boron charge. In one form of the apparatus, this is accomplished by using a carbon-resistor element having a section of reduced diameter where the electrically generated heat is concentrated, due to the resulting greater electrical resistance of that portion of reduced diameter. In this manner, regions or zones of the enclosure away from this section of the carbon resistor element are maintained at a temperature lower than that of the charge and, in accordance with the present invention, define areas or zones in which condensable impurities may be collected. Such cooler areas may be other sections or lengths of the same carbon-resistor element which are at a lower temperature due to a lower electrical resistance of the larger cross-sectional areas of those portions of the element.

In addition to the boron suboxides which are condensable under the conditions contemplated and which, along with other condensable impurities, may be generally referred to as the sublimate, the vapors emitted from the boron charge contain still other vapors which are generally non-condensable. The non-condensables comprise the normally gaseous impurities in the charge or their normally gaseous oxidation or decomposition products, such as oxygen, carbon monoxide, and/or carbon dioxide. It is important to divert or separate the sublimate from the non-condensables. For example, if the sublimate were permitted to be withdrawn from the enclosure and into the evacuation equipment, condensation and deposition of the sublimate in such equipment would in time foul its operation. On the other hand, if the hot non-condensable vapors were permitted to mix indiscriminately with the sublimate vapors within the enclosure, there would be less condensation of the sublimate, and that condensate which would form would be subject to revaporization due to the heat energy transferred thereto by the noncondensable vapors. As a result, even that sublimate which initially condensed would tend to migrate through the enclosure by repeated revaporization and recondensation, and some of the sublimate would in time reach the evacuation equipment with the same undesired results.

Therefore, in accordance with the present invention, the sublimate and the noncondensable distillation products are effectively separated by providing a condensing surface within the enclosure on which the sublimate is cooled and condensed to the solid state. At the same time, the non-condensables are removed at least from the zone of the condensing surface and evacuated from the enclosure as soon as possible. In the preferred practice, the condensing surface is positioned at one portion of the enclosure, and the effect of the "pull" of the evacuating equipment is placed at another portion of the enclosure remote from the first so as to facilitate the separation of the condensed sublimate and the noncondensables. Generally, since the heated vapors of the sublimate tend to rise within the enclosure, the condensing zone is located above the relatively restricted heating zone of the carbon resistor element within the enclosure, and an evacuation port for the evacuation equipment is located below that heating zone.

As a modification of the invention, it is contemplated to remove carbon impurities from the crude boron simultaneously with removal of boron suboxides by using $B_2O_3$ to oxidize the carbon to a volatile oxide, usually carbon monoxide. Even though $B_2O_3$ volatilizes at temperatures above 1200° C., it appears that any significant amount of carbon present acts to reduce the $B_2O_3$ to a less volatile suboxide before the $B_2O_3$ has an opportunity to volatilize. Thus, the oxidation of carbon by $B_2O_3$ uniquely supplements the main feature of the invention, i.e., removal of boron suboxides. Consequently, when treating a crude boron containing both $B_2O_3$ and boron suboxides as impurities, along with carbon in an amount no greater than that which will reduce the $B_2O_3$ to suboxides, substantially all of the boron oxides and carbon may be removed by the process of this invention to leave a total of these impurities in the purified product of less than 1 percent and generally less than 0.5 percent. Should the amount of $B_2O_3$ in the crude boron be insufficient to oxidize the carbon present as described, additional $B_2O_3$ may be added to the charge for this purpose. An excess of $B_2O_3$ over the stoichiometric amount required to oxidize the carbon is preferably employed, because some of the $B_2O_3$ is apt to be removed by volatilization before it can react with the carbon present.

The drawing shows one form of apparatus that may be used to carry out the present invention. A double-walled copper enclosure 10 makes an air-tight seal with a base plate 11 by means of an O-ring seal 11a or the like. The enclosure 10 may be cooled by circulating a coolant, such as water, between the walls in a conventional manner (not shown). As sight glass 12 may be mounted at an opening through the walls of the enclosure 10 to enable an operator to view the internal apparatus.

The internal apparatus includes a cylindrical graphite tube 13, adapted to be heated by its own electrical resistance. This tube is disposed substantially vertically within the enclosure 10 and has a medial section 14 of reduced external diameter that provides a thin wall portion of increased electrical resistance for concentrating the resistance heating in a desired region or zone. Graphite or carbon is the only sufficiently refractory resistance material that has yet been found acceptable for use under the conditions of the present invention. Tungsten and molybdenum, for example, are not satisfactory above about 1800° C. Tantalum tends to vaporize at such relatively high temperatures. Also, these metals tend to contaminate the purified product.

Separable upper and lower end clamps 15 and 16 respectively comprise pairs 15a–15b and 16a–16b of hollow C-shaped, copper clamp sections shaped to embrace the graphite tube 13. Bolts 19 extending through the clamp sections pull the sections together for frictionally gripping the graphite tube.

A circulating coolant, usually water, and electrical power are furnished to the heating assembly via the clamps 15 and 16. More particularly, each clamp section 15a, 15b, 16a, and 16b is separately cooled. For example, a copper tube 20 carries water from a suitable pressurized supply to section 15a of clamp 15; the water flows through cooling passages (not shown) in this clamp section; and a copper tube 21 carries the water away from this clamp section and out of the enclosure. Similarly, copper tubes 22 and 23 service clamp section 15b; copper tubes 25 and 26 service clamp section 16a; and copper tubes 27 and 28 service clamp section 16b.

The designated copper tubes also serve as conductors to impress an electrical potential across the length of the graphite tube 13 between the upper and lower clamps 15 and 16. Therefore, all eight of those copper tubes are electrically insulated from the base plate 11 by rubber bushings (not shown) which also serve as vacuum seals. A standard transformer supplies the required electrical potential and has one lead connected to each of the copper tubes 20, 21, 22, and 23 and another lead connected to each of the copper tubes 25, 26, 27, and 28.

In order to assist in supporting and rigidifying the heating assembly within the enclosure 10, a copper support plate 29 is positioned within the enclosure and rigidly mounted above the base plate 11. The support plate 29 has openings that tightly receive and rigidify the four copper tubes 25–28, which in turn support the plate. Between the plate 29 and the lower clamp 16, copper bellows 25', 26', 27', and 28' constitute extensions of the copper tubes 25–28 and accommodate thermal expansion and contraction of the graphite resistor 13. These bellows are silver-soldered to the support plate 29 and to the appropriate clamp sections 16a and 16b.

Within the hollow graphite tube 13, a refractory pedestal 30 supports a crucible 32 which contains the briquetted boron charge to be purified. The crucible 32 may suitably be made of zirconium oxide or boron nitride and is centered within the portion 14 of reduced wall thickness of the graphite tube 13. The pedestal may be made of the same or other sufficiently stable refractory material and is of a sufficient length to rest upon an electrical insulating disc 31 which, in turn, rests upon the support plate 29 while this assembly supports the crucible 32 within the resistor tube portion 14 of reduced diameter. The entire enclosure is evacuated through a conduit 33 connected to an evacuation port 34 in the base plate 11. The conduit 33 is preferably made of an electrically nonconducting material, such as glass.

In a typical run, the boron charge was placed within the crucible 32, and the enclosure was evacuated to about four to six microns of mercury, absolute pressure, before applying electrical energy to the resistor element to heat the charge. In one specific installation, the graphite tube 13 was about 14 inches long and had an internal diameter of about two inches and an outside diameter of about 2.5 inches, except for the portion of reduced diameter. This portion had the same inside diameter but an outside diameter of about 2.2 inches. An alternating current of about 2000 amperes at about ten volts was passed through the tube 13. Because of its greater electrical resistance, the reduced medial portion 14 concentrated the generated heat on the crucible 32 and its contents. The voltage to the heating element 13 was controlled to maintain the temperature of the heating element and of the crucible and charge material within the heating element, and the temperature of the charge was measured through the sight glass by means of an optical pyrometer within an accuracy of about plus or minus five centigrade degrees.

The charge was first heated to a degassing temperature of about 800° C. to 900° C. Within a period of about 10 minutes after reaching the degassing temperature, the pressure rose to about 130 microns of mercury, absolute pressure, and then gradually dropped to about 80 microns, at which point degassing was considered to be sufficiently complete. The temperature of the charge was then raised as rapidly as possible (over a period of about 10 to 15 minutes) to above 1200° C. and then more gradually over a period of approximately 20 minutes to a final reaction temperature in the range of about 1800° C. to about 2100° C. Various reaction temperatures within this latter range have been successfully employed in a variety of different runs.

As the vapors of the sublimate (almost entirely the boron suboxides) and the gaseous noncondensables evolved, the sublimate vapors rose due to heat convection currents, and the sublimate condensed primarily on the inner surface of the graphite tube 13 over a portion of its length above the crucible 32 where the tube temperature was well below the reaction temperature. This condensation zone is indicated generally by 35 in FIG. 1. The surfaces of clamp 15 and the upper inner surfaces of the enclosure 10, being still cooler, also tended to condense any of the sublimate that escaped condensation in the zone 35. If magnesium is present as an impurity in the boron charge, the magnesium tends to deposit on the clamp 15, since magnesium is more difficult to condense than the boron suboxides, and the clamp 15 is cooler than the inside of the upper portion of the tube 13. The condensed sublimate was thus effectively separated from the boron in the charge and was not able to recontaminate it.

The noncondensable vapors had little opportunity to circulate around the condensed sublimate, since the noncondensable vapors were quickly withdrawn downwardly around the outside of the heating assembly toward the evacuation port 34 and away from those areas in and around the tube 13 where the sublimate condensed.

The boron was held within the stated range of operating conditions until a desired purity of boron was obtained. The sight glass 12 enabled the operator to observe the extent of condensation of the sublimate within the enclosure 10. After stable pressure readings in the range of about 2 to 10 microns of mercury indicated an end to the evolution of impurities from the charge, the current was interrupted and the enclosure 10 was allowed to cool while still held under vacuum in the latter pressure range. For more rapid cooling, the enclosure may be filled with an inert gas such as argon or neon. When cool, the enclosure was opened and the purified boron product removed.

Normally, a crude boron produced in any of the several known ways is subjected to leaching and washing steps for removal of soluble impurities, and such steps are commonly repeated after various prior art upgrading procedures are employed. With the present invention, however, no recontamination with soluble impurities has been encountered and repetition of such leaching and washing steps on the upgraded product of this invention has been found to be unecessary.

The invention is additionally illustrated by the following examples, although it is to be understood that the invention is not limited to the details set forth. The percentages stated in the examples are by weight. These examples were carried out by apparatus similar to that previously described in connection with FIG. 1 and in accordance with the operating procedure of the described typical run for bringing the temperature of the charge to the selected reaction temperature and for cooling it prior to recovery of the product.

EXAMPLE 1

A charge of 40 grams of crude amorphous boron having the following analysis was pressed into a briquette and placed in a zirconium oxide crucible:

| Ingredient— | Percent |
|---|---|
| Boron | 98.09 |
| Boron suboxides | 1.50 |
| Iron | 0.10 |
| Oxygen (other than as suboxides) | 0.20 |

The crucible was 3½ inches high and 1⅞ inches outside diameter and had internal dimensions of 3¼ inches in height and 1.50 inches in diameter. The crucible was placed in a type of vacuum furnace described above, and the interior of the furnace chamber was evacuated by means of a vacuum pump and an oil diffusion pump to a pressure of about 10 microns of mercury, absolute pressure.

An electrical potential was then imposed upon the cylindrical heating element. The crucible and its ingredients were gradually elevated in temperature. At about 1750° C. there was a noticeable evolution of gas manifested by an increase of pressure to about 125 microns of mercury, absolute pressure. As the temperature was increased to about 1950° C., the evolution of gas gradually subsided. Within about half an hour the pressure returned to about 10 microns of mercury.

The temperature of 1950° C., was maintained for at least another hour under the same pressure of about 10 microns of mercury, absolute pressure. The electrical power to the heating element was then interrupted, and the sample and furnace were allowed to cool to room temperature while the partial vacuum was maintained. The treated sample comprised 99.65 percent boron. The combined oxygen content was reduced from at least 1.2 percent to about 0.02 percent.

EXAMPLE 2

A charge of crude boron having the following analysis was treated as in Example 1, except as noted below:

| Ingredient— | Percent |
|---|---|
| Boron | 92.17 |
| Boron suboxides | 4.18 |
| Iron | 0.23 |

In this run, the highest temperature reached, at the end of the reaction and for only a short period, was 2140° C. The resulting purified boron was in the form of a hard sintered mass, showing definite crystal growth. However, due to the higher temperature reached as noted above nearly 6 percent of the boron was lost by vaporization.

The analysis after the purification treatment was as follows:

| Ingredient— | Percent |
|---|---|
| Boron | 99.50 |
| Boron suboxides | 0.123 |
| Iron | 0.28 |
| Oxygen (other than as suboxides) | 0.06 |

EXAMPLE 3

Another charge of crude boron was treated in a manner similar to that described in Example 1. Prior to purification, the boron analyzed as follows:

| Ingredient— | Percent |
|---|---|
| Boron | 93.65 |
| Boron suboxides | 3.44 |
| Iron | 0.19 |

After purification in the manner described in Example 1, the product had the following composition:

| Ingredient— | Percent |
|---|---|
| Boron | 99.42 |
| Boron suboxides | 0.09 |
| Iron | 0.20 |

EXAMPLE 4

This example illustrates the effect of using $B_2O_3$ to remove a carbon impurity in a boron charge. The boron charge analyzed as follows:

| Ingredient— | Percent |
|---|---|
| Boron | 97 |
| Carbon | 0.20 |
| Iron | 0.15 |
| Suboxides and undetermined trace impurities | Balance |

Two specimens of the boron charge were treated in the manner of Example 1, except that $B_2O_3$ was added to the second specimen in an amount of 0.5 percent of the charge. After each specimen was purified in the manner of Example 1, the first specimen in which $B_2O_3$ had not been added analyzed as follows:

| Ingredient— | Percent |
|---|---|
| Boron | 99.5 |
| Iron | 0.18 |
| Carbon | 0.16 |

The purified specimen to which $B_2O_3$ had been added analyzed as follows:

| Ingredient— | Percent |
|---|---|
| Boron | 99.5 |
| Iron | 0.18 |
| Carbon | 0.092 |

Since the specimens were similarly treated, the reduction in the amount of carbon in the second specimen was due to the presence of the $B_2O_3$.

EXAMPLE 5

The crude boron charge of this example had the following starting composition:

| Ingredient— | Percent |
|---|---|
| Boron | 97 |
| Iron | 0.07 |
| Carbon | 0.15 |
| Boron suboxides and undetermined trace impurities | Balance |

Sixteen different specimens of this charge were uniformly but individually treated at 1950° C. in the manner described for Example 1. The average analysis for the product of all sixteen treatments was:

| Ingredient— | Percent |
|---|---|
| Boron | 99.69 |
| Iron | 0.10 |
| Carbon | 0.09 |

The invention, as claimed, is intended to embrace such variations of the present disclosure as will naturally occur to those skilled in the art, and also such departures from the various preferred or theoretical limits as may obviously be tolerated while gaining the benefits of the invention to something less than the optimum degree.

I claim:

1. The method of purifying crude elemental boron containing impurities including boron suboxide and carbon, comprising: evacuating a chamber containing the boron and $B_2O_3$, which may be one of said impurities, in a restricted heating zone within the chamber to lower the chamber pressure into the range of about 0.1 micron to about 200 microns of mercury, absolute pressure; generating heat within the chamber and concentrating the heat on the boron and the $B_2O_3$ to raise their temperature to within the range of about 1800° C. to about 2100° C. for forming a gaseous oxide of carbon while reducing $B_2O_3$ to boron suboxide and for vaporizing the boron suboxides and any excess $B_2O_3$ from the boron along with noncondensable gaseous distillation products including the gaseous oxide of carbon whole maintaining cooler zones within the chamber about said heating zone; condensing the boron suboxides and any excess $B_2O_3$ in said cooler zones and drawing the noncondensables away from said cooler zones and out of the chamber by continuing said evacuation during the heating step.

References Cited

UNITED STATES PATENTS

| 1,279,146 | 9/1918 | Peacock | 219—427 |
| 2,415,946 | 2/1947 | Gross | 23—209 |
| 2,794,708 | 6/1957 | Haag | 23—209 |
| 2,866,688 | 12/1958 | Mozza et al. | 23—209 |

FOREIGN PATENTS

| 841,980 | 7/1960 | Great Britain | 23—209 |

OSCAR R. VERTIZ, Primary Examiner

H. S. MILLER, Assistant Examiner

U.S. Cl. X.R.

23—277

PO-1050
(5/69)

UNITED STATES PATENT OFFICE
CERTIFICATE OF CORRECTION

Patent No. 3,551,105　　　　　　　　Dated December 29, 1970

Inventor(s) Hugh S. Cooper

It is certified that error appears in the above-identified patent and that said Letters Patent are hereby corrected as shown below:

Column 1, line 3, change "to" to --by--.

Column 1, line 4, delete "Walter M. Weil" and insert --mesne assignments to Cooper Metallurgical Corporation, Cleveland, Ohio, a corporation of Ohio--.

Signed and sealed this 6th day of July 1971.

(SEAL)
Attest:

EDWARD M. FLETCHER, JR.　　　　　　　WILLIAM E. SCHUYLER, JR
Attesting Officer　　　　　　　　　　Commissioner of Patents